(12) United States Patent
Bertoni et al.

(10) Patent No.: US 8,944,117 B2
(45) Date of Patent: Feb. 3, 2015

(54) METHOD FOR DISPENSING A LIQUID INTO A CONTAINER AND RELATED DISPENSER

(75) Inventors: Cristina Bertoni, Trieste (IT); Andrei Uhov, St. Petersburg (RU); Elvio Zanon, Camino al Tagliamento (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 717 days.

(21) Appl. No.: 13/143,617

(22) PCT Filed: Jan. 5, 2010

(86) PCT No.: PCT/EP2010/000016
§ 371 (c)(1),
(2), (4) Date: Sep. 29, 2011

(87) PCT Pub. No.: WO2010/079121
PCT Pub. Date: Jul. 15, 2010

(65) Prior Publication Data
US 2012/0031523 A1    Feb. 9, 2012

(30) Foreign Application Priority Data
Jan. 8, 2009   (IT) .............................. PN2009A0028

(51) Int. Cl.
*B65B 3/04*   (2006.01)
*G01F 23/26*   (2006.01)
(Continued)

(52) U.S. Cl.
CPC ............ *G01F 23/261* (2013.01); *B67D 1/1238* (2013.01); *B67D 1/0888* (2013.01); *B67D 1/1247* (2013.01)
USPC ................. 141/2; 141/95; 141/198; 141/360; 73/290 R; 137/392

(58) Field of Classification Search
CPC ...... B67D 1/1238; B67D 1/124; G01F 23/26; G01F 23/268

USPC ...... 141/95, 198, 360, 1, 2; 73/290 R, 304 R, 73/304 C; 137/392
See application file for complete search history.

(56) References Cited

U.S. PATENT DOCUMENTS 2,523,363 A * 9/1950 Gehman ........................... 141/1
3,916,963 A * 11/1975 McIntosh ...................... 141/198
(Continued)

FOREIGN PATENT DOCUMENTS

| EP | 0390414 | 10/1990 |
| GB | 2185961 | 8/1987 |

OTHER PUBLICATIONS

International Search Report for PCT/EP2010/000016, dated Apr. 6, 2010, 2 pages.

*Primary Examiner* — Timothy L Maust
*Assistant Examiner* — Timothy P Kelly
(74) *Attorney, Agent, or Firm* — Pearne & Gordon LLP (57) ABSTRACT

The present invention relates to a method for dispensing a liquid to fill a container (4) up to a predetermined liquid level. The invention also refers to a dispenser capable of achieving such a method. A method for dispensing a liquid (2, 22) in a container (4) according to the invention is characterized by a combination of the following steps: (a) place a container (4) beneath an outlet (6, 26a, 26b) of at least one fluid dispensing conduit (3, 23a, 23b); (b) arrange a pair of electrodes (9, 13, 9a, 13a, 29, 213) in a position where they are adapted to face the this liquid (2), electrically isolated from the same, (c) starting the flow of liquid through the the conduit (3); (d) measuring the effective impedance (Z) between the first and second electrode (9, 13; 9a, 13a, 29, 213) during the liquid flow; (e) compare the actual impedance (Z) with a reference impedance (Z1); and (f) interrupting the liquid flow when a predetermined condition between the effective impedance (Z) and the reference impedance (Z1) is achieved.

15 Claims, 5 Drawing Sheets

(51) Int. Cl.
  *B67D 1/12* (2006.01)
  *B67D 1/08* (2006.01)

(56) References Cited

U.S. PATENT DOCUMENTS

| | | | |
|---|---|---|---|
| 4,236,553 A * | 12/1980 | Reichenberger | 141/198 |
| 4,641,692 A | 2/1987 | Bennett | |
| 4,738,285 A | 4/1988 | Belland | |
| 4,749,988 A * | 6/1988 | Berman et al. | 340/618 |
| 4,753,277 A | 6/1988 | Holcomb et al. | |
| 4,961,456 A * | 10/1990 | Stembridge et al. | 141/1 |
| 4,974,643 A * | 12/1990 | Bennett et al. | 141/1 |
| 5,017,909 A * | 5/1991 | Goekler | 340/620 |
| 5,465,619 A * | 11/1995 | Sotack et al. | 73/304 C |
| 6,539,797 B2 * | 4/2003 | Livingston et al. | 73/304 C |
| 6,684,920 B2 * | 2/2004 | Seitz et al. | 141/198 |
| 7,171,993 B2 * | 2/2007 | Bethuy et al. | 141/198 |
| 8,151,596 B2 * | 4/2012 | Richmond et al. | 62/391 |
| 8,443,614 B2 * | 5/2013 | Kim | 62/3.64 |
| 2011/0314907 A1 * | 12/2011 | Wiedekind-Klein | 73/304 C |
| 2012/0227484 A1 * | 9/2012 | Chen et al. | 73/304 R |
| 2013/0026084 A1 * | 1/2013 | Schneider et al. | 210/97 |

* cited by examiner

METHOD FOR DISPENSING A LIQUID INTO A CONTAINER AND RELATED DISPENSER

The present invention relates to a method for dispensing a liquid to fill a container up to a predetermined level of said liquid. The invention also refers to a dispenser suitable for carrying out such a method thereof A system widely known in the state of the art consists in dispensing liquid from a dispensing unit with a pair of electrodes connected to an electric current generator, in which one of these electrodes is arranged in correspondence of a liquid opening or outlet, so to apply a voltage, i.e. exciting the liquid to be dispensed, while the second of these electrodes is arranged in correspondence of a button or push lever that is operated by the user upon placing a glass under the said liquid outlet. Operating such lever causes the activation of a valve, thereby allowing the liquid to outflow from the outlet and to fill the glass beneath. Automatic liquid outflow interruption is controlled by a controller when the electrically excited liquid inside the glass overflows from the edge of the glass itself and comes into contact with the electrode on the lever. Such liquid overflow causes a switch of the electrodes state, that pass from a first condition, in which they are isolated from each other, to a second condition, in which they are electrically connected to each other. The presence of an electric current in the circuit formed by the generator, the electrodes and the dispensed liquid can be measured, thereby providing a measurable indication of when the glass is completely filled with fluid. Thus, when a current is measured between the electrodes, an interruption signal can be outputted by the controller to disconnect and close the valve and to stop the liquid dispensing operation.

A dispensing unit operating as described above is disclosed in U.S. Pat. No. 4,753,277. Such known type of dispensing unit, however, has a serious drawback consisting in the fact that it is adapted to interrupt the dispensed liquid outflow only when the container to be filled is completely full of liquid. With a dispenser according to said U.S. Pat. No. 4,753,277 is not in fact possible to interrupt the dispensed liquid outflow when the liquid introduced in the container reaches a predetermined or desired level below that which is the maximum capacity of the container itself. This is due to the fact that, until the liquid level in the container reaches the upper edge, the electrodes remain isolated from each other.

A further disadvantage of a dispenser according to the said U.S. Pat. No. 4,753,277 is that any interruption in the liquid outflow is always associated with a liquid overflow, with the result of actually creating the need for providing and operating a frequent emptying of a drip pan placed beneath the container, with the risk that the liquid will ends up dirtying the part of the dispenser and the area surrounding the dispenser itself.

Another typical drawback of a dispenser of the kind described above is that the liquid inside the container may be contaminated by contact with the electrode arranged on the push lever when the liquid overflows from the upper edge of the container. Considering that such contamination may give rise to hygiene-health risks, the user must especially behave, namely to take particular care in providing properly frequent lever cleaning, which can also result undoubtedly annoying and, anyway, certainly not sufficiently safe to ensure the drink complete integrity from a hygienic-health standpoint.

A further disadvantage of the dispenser type mentioned above is that the user can touch, that is accidentally come in contact, with energized electrodes, receiving a shock.

Still another drawback of a dispenser according to said U.S. Pat. No. 4,753,27 is that an electric current exciting the dispensed liquid can alter its characteristics, such as flavor and aroma, and is therefore unwelcome by user.

The purpose that the present invention therefore seeks to achieve is to solve the problems mentioned above and, to that effect, to propose a method and a dispenser to dispense a liquid in which it is unnecessary to create a dangerous electrically energized path between the user and the power line.

Another purpose of this invention is to provide a method and a dispenser to dispense a liquid in which the liquid contamination risk by foreign bodies or foreign matters is entirely avoided.

Still another purpose of the present invention is to provide a method and a dispenser to dispense a liquid into containers not only of different shapes but also of different capacities, and made of any suitable material, even if not electrically conducting, the container filling being in turn carried out up to any predetermined liquid level inside the container thereof.

A further purpose of this invention is to provide a method for dispensing a liquid adapted to avoid a liquid overflow from the container.

Another purpose of this invention is to provide a method for dispensing a liquid that can be easily implemented in a stand alone dispensing device or in a dispensing device embedded into a household appliance such as a refrigerator.

Still another purpose of the present invention is to provide a method and a dispenser to dispense a liquid which are capable of respecting and preserving the delivered liquid original characteristics, without having the latter possibly altered during the dispensing.

The features, aspects and advantages of the present invention will be more clearly understood in part from the following description and from what illustrated in the attached drawings, and in part the features, aspects and advantages of the present invention will be made obvious to those skilled in the art by reading and examining what follows or may be learned by practicing the invention itself. Purposes and advantages of the invention can be achieved and realized with the terms and features better specified in the attached claims.

The attached drawings, which are included to enable a better understanding of the invention and are incorporated in and constitute integral part of this description, show a possible embodiment of the present invention and, together with the description given below, serve to explain the principles of the invention.

Figure 1:
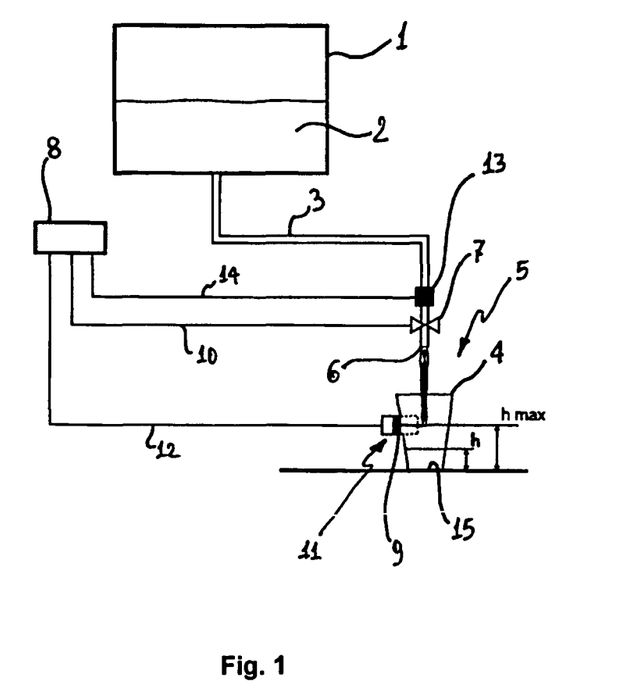
FIG. 1 shows a schematic view of a first embodiment of a dispenser according to the present invention.
Figure 2:
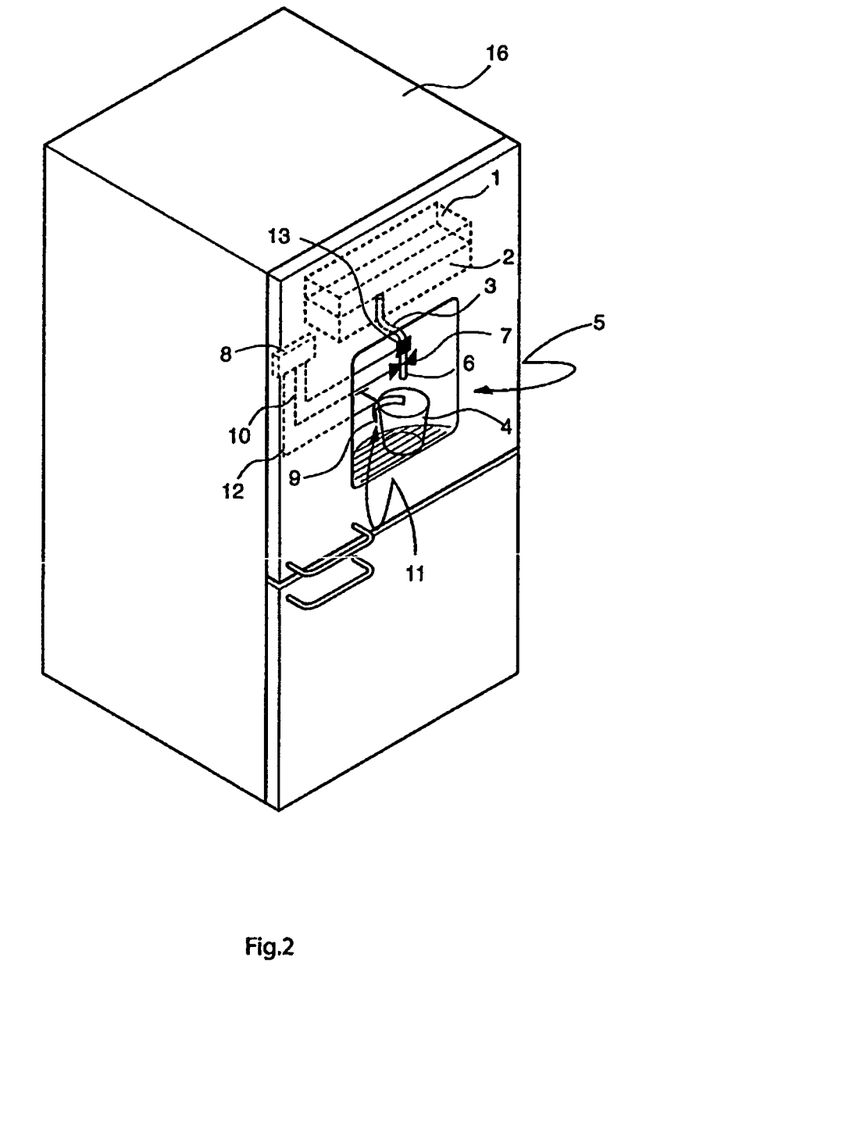
FIG. 2 shows a schematic view of the dispenser of FIG. 1 embedded in a refrigerator.

Referring now to FIGS. 1 and 2, there is schematically shown a dispenser according to the present invention which comprises a reservoir 1 adapted to contain a liquid 2, like a beverage, to be dispensed. A conduit 3, preferably made of plastic, is hydraulically connected to said reservoir 1 and has an outlet 6 for dispensing the liquid 2 from reservoir 1 to a container 4 that a user can place in a receptacle 5. If preferred, the reservoir 1 may be omitted and the conduit 3 can be connected directly to a liquid source or main liquid line, such as a town water supply.

In order to start and stop the liquid flow in the conduit 3, on said conduit 3 there is a valve 7. As more widely described in the following, the valve 7 is controlled by output signals of a controller 8 which is programmed to take into account situations regarding the condition in which a container 4 (typically a glass) is or is not placed under the outlet 6 of the conduit, and the condition that the liquid 2 inside the container 4 has reached or not a predetermined level hmax.

In order to start a dispensing of liquid 2, inside the receptacle 5 the dispenser is preferably equipped with a lever 11 arranged in such a way to be moved by one container 4 when the latter is put in this receptacle 5. The movement of lever 11 mechanically actuates a known type of switch (not shown in Figures), whose output signal is then received by a controller 8 which in turn actuates the valve 7 to open by means of a drive signal sent to the valve 7 via an electrical or other kind of connection (e.g. an electric wire) 10.

A first electrode 9 is arranged in a position which is adapted to enable it to be moved against, namely facing towards the liquid 2, so as to cause said electrode 9 to be electrically isolated from the liquid, but capable of detecting whether the liquid itself is or is not in front of it by means of a measure of impedance that will be more extensively and in detail described in the following. In the drawing of FIGS. 1 and 2, the first electrode 9 is arranged to be directed towards the outer surface of the container 4 when the latter is placed under the outlet 6 to receive the dispensed liquid 2. If the dispenser has a lever 11 as described above, the first electrode 9 may be associated with the said lever 11 to ensure that the container 4 is in contact with the electrode 9. The first electrode 9 is electrically connected to the controller 8 via an electrical or other kind of connection 12. A second electrode 13 is arranged on the outer surface of the conduit 3 so that the liquid can flow in the same conduit 3 without contacting said electrode. The insulating effect created by the non-electrically conductive nature of the conduit 3 is sufficient to prevent the electrode 13 from transmitting a current to the liquid 2. The second electrode 13 is electrically connected to the controller 8 by means of an electrical or other kind of connection 14. The controller 8 and the electrodes 9, 13 are properly supplied in a manner known in itself by electrical power supply means, not shown in the drawings.

The position of the first electrode 9 with respect to the base 15 of the container 4 sets, or better establishes the liquid level hmax (FIG. 1) to be attained by the liquid 2 inside the container 4. The position of the first electrode 9 is preferably capable of being adjusted with respect to the container 4 so as to allow the user to fill the container 4 at different levels and get consequently to the desired and most appropriate liquid level depending on the container 4 capacity and shape.

Once started the liquid dispensing flow by the user, e.g. as a consequence of the lever 11 mechanical displacement determined by the insertion of the container 4 into its receptacle 5, this flow will continue until the liquid inside the container 4 reaches the level hmax; once reached that level, the liquid flow is stopped by the controller 8 which closes the valve 7 via a closing signal sent trough the connection 10. In order to achieve the automatic flow stop upon reaching said liquid level hmax inside the container, the controller 8 measures the impedance Z that exists between the first and second electrodes 9, 13. A first measurement of impedance Z1 is made at a time t1 in the condition in which there is no liquid simultaneously in front of both electrodes 9, 13, i.e. before or immediately after the valve 7 has been opened to pour liquid inside the container 4. While the liquid flow is then going on, the impedance Z between the electrodes 9, 13 is continuously monitored by the controller 8 and its value is continuously compared to the first measured value Z1, until when, at an instant t2 corresponding to the time when the liquid 2 inside the container has reached the level hmax, namely the position of the first electrode 9, the value of impedance Z takes a second value Z2, so that Z1≠Z2. When such predetermined condition is reached, the liquid flow through the conduit 3 is stopped. In practice, the impedance value Z1 measured by controller 8 remains substantially constant during the liquid dispensing operation until the liquid level h, gradually growing in the container 4, comes in front of the position of the first electrode 9, thereby reaches the value hmax at which the impedance Z changes almost instantaneously from Z1 to Z2.

Since the measure of the impedance Z is inherently affected by a measurement error due to the characteristics of the measurement arrangement, said predetermined condition Z1≠Z2 which has to be met to determine the interruption of liquid flow can be considered verified by the controller 8 if the difference between the measured values Z1, Z2 is greater than a predetermined value ε. In this way measurement errors can be compensated and the condition Z1≠Z2 to be met to determine the interruption of the liquid flow will actually be reached or, better, satisfied when the liquid level h in the container reaches a position opposite to that where the first electrode 9 is arranged, i.e. when h=hmax.

Figure 3:
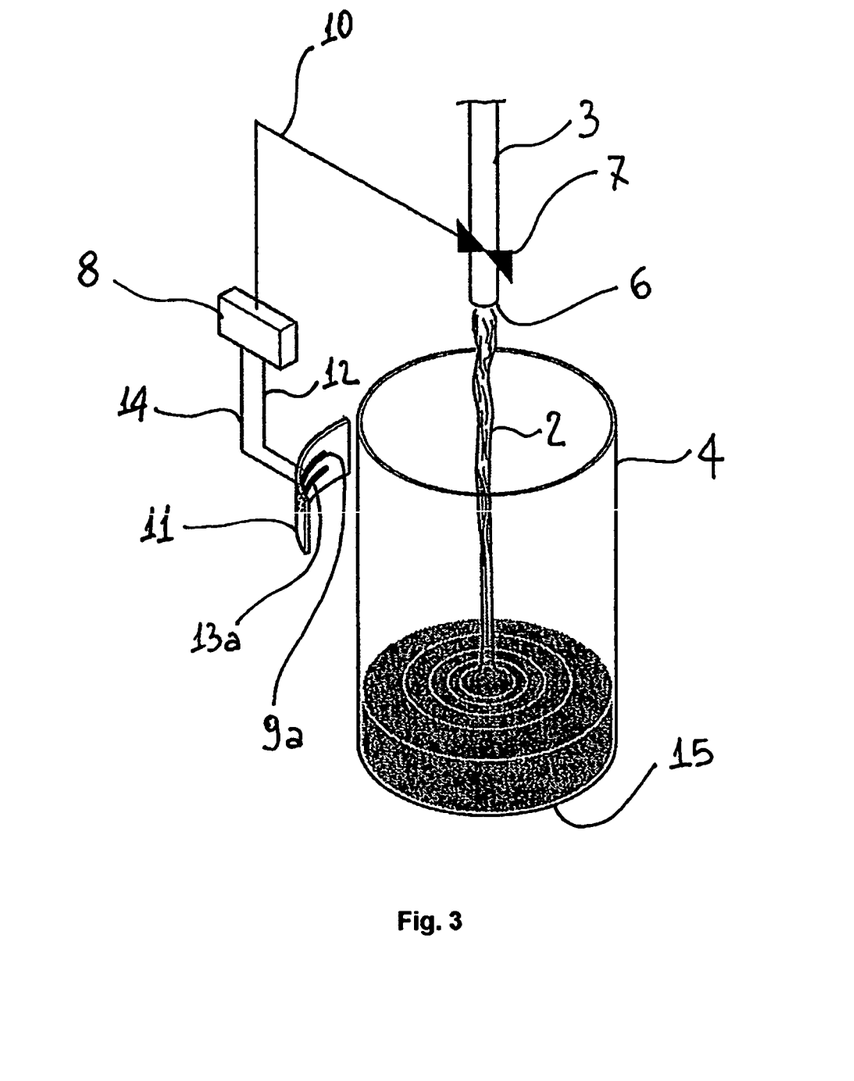
FIG. 3 shows a schematic view of a variant of the first embodiment of the present invention illustrated in FIG. 1.

In FIG. 3 a variant of a first embodiment of the dispenser is shown, in which both the first and the second electrodes 9a, 13a on the lever 11 are arranged at different heights from the base 15 of a container 4. When in the receptacle 5 a container 4 is introduced and housed, the lever 11 is mechanically displaced and the valve 7 is opened by the controller 8 to begin pouring liquid 2 through the conduit 3. In this position, the electrodes 9a, 13a face the container 4 and the liquid 2 when the latter is poured. Similarly to what has been described with reference to FIGS. 1 and 2, the controller 8 performs an initial measurement of the impedance Z1 existing between the first and second electrodes 9a, 13a at an instant t1 when there is no liquid in front of the two electrodes, or when said liquid is facing only the lower electrode 13a. The impedance Z between the electrodes 9a, 13a is continuously monitored by the controller 8 while fluid 2 outflows from the conduit 3. If, at a time t2 after t1 which corresponds to the time when the liquid 2 has reached the level hmax, namely the position of the first electrode 9a, the value of the impedance Z takes a second value Z2, so Z1≠Z2. In this predetermined condition, the liquid 2 is located in front of both the electrodes 9a, 13a and the liquid flow through the conduit 3 is stopped. Moreover, as the change in effective impedance measured between electrodes 9a, 13a stops the liquid pouring, the positioning of the container 4 in relation with the electrodes (or, in other words, with respect to the lever 11) allows the user to fill the container 4 at different levels and consequently to the desired and most appropriate level of liquid depending on the container 4 capacity and shape.

Figure 4:
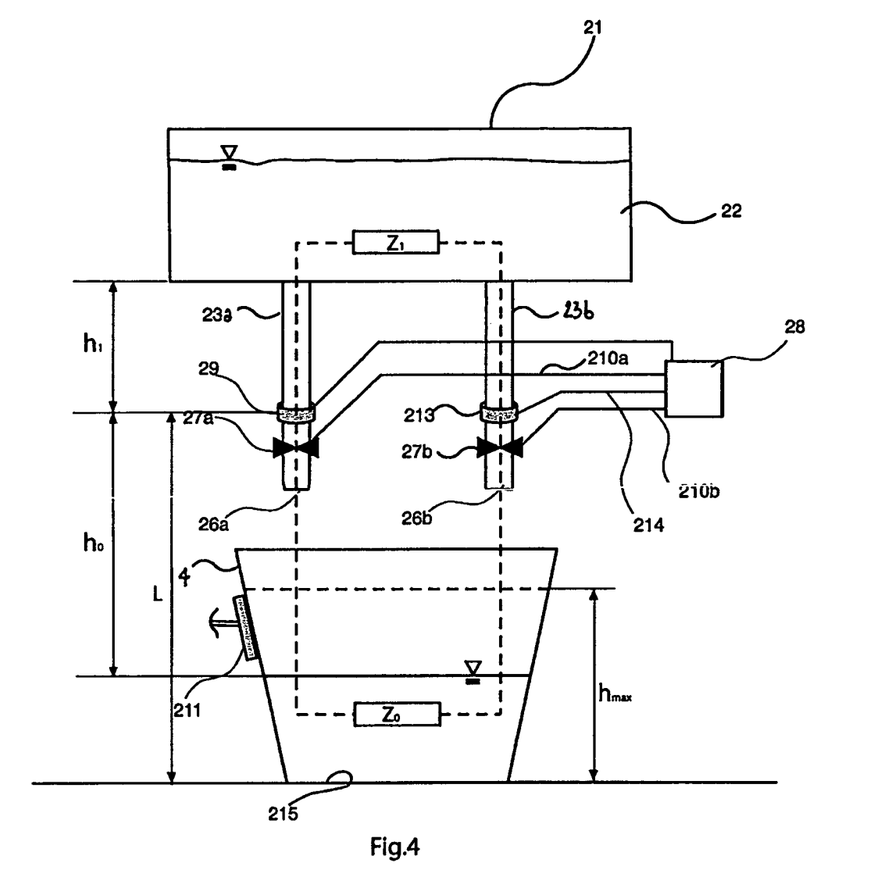
FIG. 4 shows a schematic view of a second embodiment of a dispenser according to the present invention.
Figure 5:
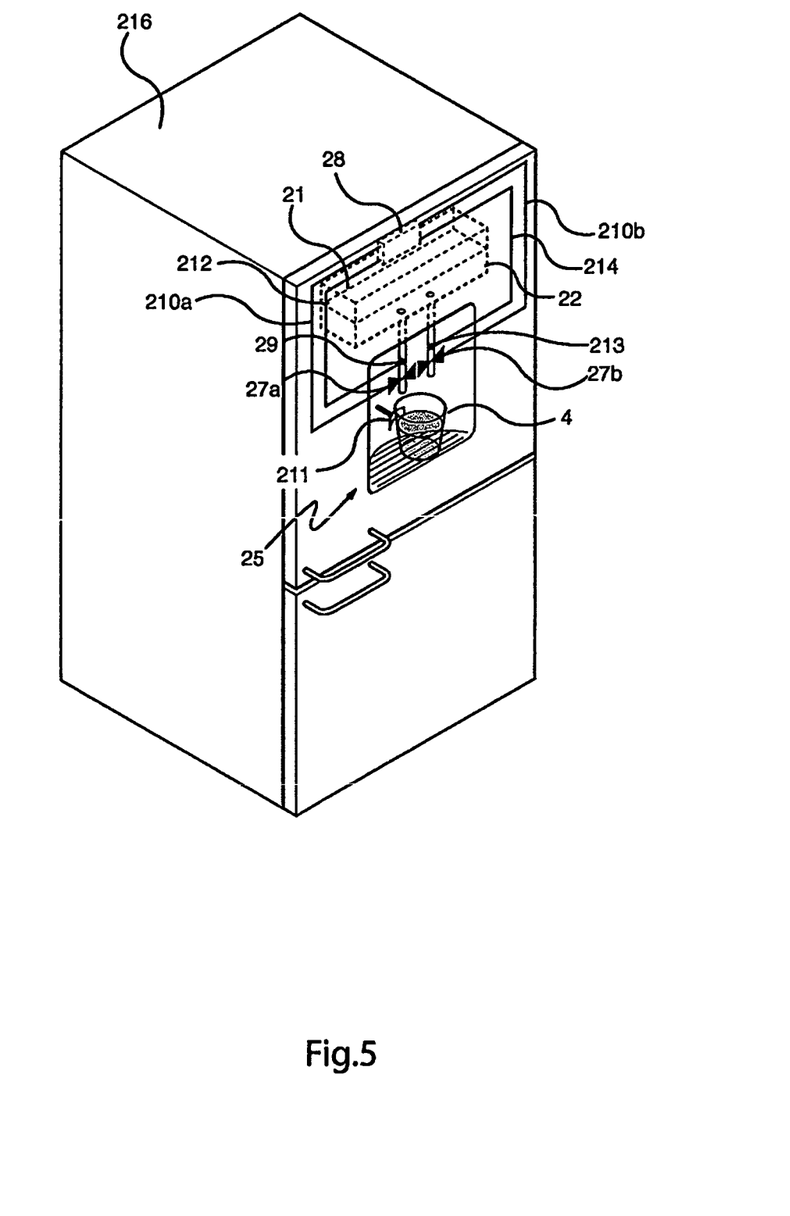
FIG. 5 shows a schematic view of the dispenser of FIG. 4 embedded in a refrigerator.

With reference to FIGS. 4 and 5, a second embodiment of a dispenser in accordance with the present invention includes a reservoir 21 suitable to contain a liquid 22, such as a beverage, to be dispensed. A pair of conduits 23a, 23b, preferably made of plastic, is hydraulically connected to this reservoir 21 and each has a respective outlet 26a, 26b for the liquid 22 dispensing from reservoir 21 to a container 4 that a user can arrange in a receptacle 25. If preferred, the reservoir 21 may be omitted and the conduits 23a, 23b can be connected directly to a liquid source or main liquid line, such as a town water supply.

A valve 27a, 27b is present in each of these conduits 23a, 23b, respectively, in order to start and stop the flow of fluid in the conduits themselves. Similarly to what has been described with reference to the first embodiment of the present invention described above, the valves 27a, 27b are controlled by output signals of a controller 28 which is programmed to take account of situations regarding the condition in which a container 4 (typically a glass) is or is not placed below the conduits outlets 26a, 26b and of the condition that the liquid 22 within the container 4 has reached a predetermined level hmax or not.

A lever 211 may be arranged in the receptacle 25 so as to be displaced when a container 4 is placed in the receptacle 25 itself. This displacement mechanically operates a switch whose output signal is received by the controller 28 which in turn controls the opening of the valves 27a, 27b via a drive signal sent to the valves through respective electrical or other kind of connection 210a, 210b. For the sake of clarity, in FIGS. 4 and 5 the electrical connection between the controller 28 and the lever 211 is not shown.

On the outer surface of each conduit 23a, 23b a first and a second electrode 29, 213 are provided, which are arranged in such a way as to result electrically isolated from the fluid 22 flowing in the conduits, but to be able to detect, through a measure impedance, if in front of each of them there is the liquid. Both the electrodes 29, 213 are electrically connected to the controller 28 via respective electrical or other kind of connections 212, 214. The controller 28 and the electrodes 29, 213 are properly supplied in a manner known in itself by electrical power supply means, not shown.

In this second embodiment of a dispenser in accordance with the present invention, at an instant t1, just before a flow of liquid is started by a user, e.g. by inserting a container 4 in the receptacle 25 and thereby operating the lever 211, a first measure of the impedance Z1 existing between the first and second electrode 29, 213 is made. At said instant t1 the electrodes 29, 213 are in front of the liquid present in the conduits 23a, 23b, whose openings or outlets 26a, 26b are still closed, so that the impedance Z1 corresponds to that existing in the electrical circuit connecting the electrodes 29, 213, namely the circuit formed by the walls of the conduits 23a, 23b and by the liquid 22 contained in these conduits and the reservoir 21. The value of Z1 is taken as reference value for the length h1 of the two conduits 23a, 23b considering that the conductivity in the liquid between two electrodes depends on the distance between them. Since the length h1 is a constant geometric parameter of the dispenser, each time liquid 22 is to be poured a new impedance value Z1 is associated with the length h1 to compensate fluctuations, i.e. oscillations in the initial impedance value mainly due to the temperature and the liquid type. In this way, a compensated reference impedance value Z1 is determined each time the liquid dispenser is put into operation.

After the liquid flow is started through the outlets 26a, 26b, the electrical circuit connecting to each other the first and second electrode 29, 213 not only includes the impedance Z1, but also a further impedance Z0, in parallel with Z1, which is indicative of the liquid between the electrodes 29, 213 and the base 215 of the container 4. Obviously, the impedance Z0 decreases as the liquid 22 fills the container 4 due to the fact that the path or portion of liquid between the outlets 26a, 26b and the liquid surface in the container 4 gets shorter and shorter.

The impedance $1/Zeq=\Sigma 1/Zi$ (i=0,1), equivalent to Z1 and Z0 in parallel between the electrodes 29, 213, is continuously monitored by the controller 28 and compared to the impedance initial value Z1 until, at an instant t2 after t1, a predetermined value Zeq=Z2 is reached corresponding to a particular height or liquid 22 level hmax in the container 4. At the instant t2, the controller 28 closes the valves 27a, 27b via an appropriate closing signal sent through the wire connections 210a, 210b.

The above predetermined condition Zeq=Z2 that Zeq has to reach to have the controller 28 stop the liquid flow can easily be predetermined considering that the impedance value Z1 associated with the length h1 is always known from the measurement made at the instant t1, and that the impedance Z0 can be expressed as a function of Z1 and of the variable length h0 existing between the electrodes 29, 213 and the liquid surface inside the container 4 during the liquid dispensing operation. The length h0 can be expressed as a function of h1 that is known, being a parameter related to the dispenser geometric configuration. For example, when Z1 is measured and associated to the length h1, Z0 will be equal to Z1 only when h0 will be equal to h1. Considering that the distance L between the electrodes 29, 213 and the container 4 base 215 is a constant geometric parameter, the level hmax reached by the liquid in the container 4 can be easily determined as (L-h0). Based on the above, the variable height h0 of the liquid inside the container 4, as measured by the position of the electrodes 29, 213, may be associated with the impedance value Zeq monitored by the controller 28.

As already described with reference to the first embodiment of the present invention described above, in order to have the closing of the valves 27a, 27b, driven by the controller 28, and then the stop of the liquid dispensing operation, said predetermined condition that is to be satisfied by the impedance Zeq=Z2 measured at the instant t2 with respect to the value of impedance Z1 measured at the instant t1 may consist of a predetermined difference $\epsilon$ between Z1 and Z2.

Once predetermined the impedance value Z2, at which the controller 28 has to close the valves 27a, 27b, the controller 28 may be programmed to adjust the valves in order to stop gradually the liquid flow when the level of the liquid inside the container 4 approaches to the maximum level hmax to be reached. This is possible because the controller 28 carries out a continuous monitoring of the impedance value Zeq that depends on Z1 (the latter value being known from the first measurement made at the instant t1) and on Z0, which is variable depending on the level of liquid in the container 4. In this way, a dispenser made according to the second embodiment of the present invention is thus able to assess the percentage of filling of the container 4 and adjust the flow of liquid during the dispensing operation in such a way as to prevent overflows of liquid.

A dispenser according to the present invention can be easily and advantageously embedded into a household appliance, such as a refrigerator 16, 216 as shown in FIGS. 2 and 5: in this way the reservoir 1, 21 of the dispenser will be maintained constantly cold.

In conclusion it can therefore be stated that the method of the invention for dispensing a liquid and the dispenser adapted to implement that method are suited to ensure the possibility to have a drink served to the user, that is dispensed in optimal conditions in terms of hygiene and safety, this while preserving the original organoleptic quality of the drink itself. Moreover, a method and a dispenser device according to the present invention allow the user to fill his/her container to a desired level, as considered most appropriate according to specific needs.

Obviously, several changes and variations can be made to the embodiments described above, without thereby departing from the scope of protection of the present invention.

For example, instead of the lever 11, 211 any other device for activating an electrical switch in response to a mechanical action may be provided for, such as a capacitive sensor device or a leverage device such as a pedal control.

The invention claimed is:

1. Method for dispensing a liquid in a container comprising the following steps:
   (a) positioning a container under an outlet of at least one liquid dispensing conduit;
   (b) arranging a couple of electrodes in a position suitable to face said liquid, electrically insulated therefrom;
   (c) initiating liquid flow through said conduit;
   (d) electrically connecting a controller to said couple of electrodes;
   (e) programming said controller to monitor an actual impedance (Z) between the couple of electrodes during the liquid flow;
   (f) comparing the actual impedance (Z) between the couple of electrodes with a reference impedance (Z1); and
   (g) interrupting said liquid flow when a predetermined condition between the actual impedance (Z) and the reference impedance (Z1) is reached.

2. Method for dispensing a liquid according to claim 1, wherein said reference impedance (Z1) is measured between the couple of electrodes before step (c).

3. Method for dispensing a liquid according to claim 1, wherein said reference impedance (Z1) is measured between the couple of electrodes after step (c).

4. Method for dispensing a liquid according to claim 1, wherein step (f) is carried out by said controller.

5. Method for dispensing a liquid according to claim 4, wherein, in step (g), the interruption of said liquid flow is made by said controller emitting a closing signal to valve means provided in said conduit.

6. Method for dispensing a liquid according to claim 1 wherein, in step (c), the liquid flow is mechanically activated upon accomplishment of step (a).

7. Method for dispensing a liquid according to claim 1 wherein, in step (g), said predetermined condition consists in that the actual impedance (Z) differs from the reference impedance (Z1).

8. Method for dispensing a liquid according to claim 7 wherein the actual and reference impedances (Z, Z1) are considered different if they differ by at least a predetermined value $\epsilon$.

9. A liquid dispenser comprising:
   a receptacle adapted to receive a container,
   at least one conduit hydraulically connected to liquid supply means and provided with an outlet for dispensing said liquid, characterized by comprising a couple of electrodes arranged in a position suitable for facing said liquid, electrically insulated therefrom, and
   a controller electrically connected to said electrodes and programmed to monitor an impedance Z between said electrodes, the controller being configured to:
   compare an actual impedance (Z; Zeq) between the couple of electrodes with a reference impedance (Z1; 1/Z1+1/Z0), and
   interrupt a dispensing of said liquid when a predetermined condition between the actual impedance (Z, Zeq) and the reference impedance (Z1; 1/Z1+1/Z0) is reached.

10. A liquid dispenser according to claim 9 wherein a valve means is provided in said at least one conduit, said valve means being activated by said controller in response to placement of a container within said receptacle and/or in response to measurement of impedance Z between said couple of electrodes.

11. A liquid dispenser according to claim 9, wherein at least one of said couple of electrodes is associated to a lever provided within said receptacle for activating a liquid flow through said outlet when a container is received in the receptacle.

12. A liquid dispenser according to claim 11, wherein the position of said at least one of said couple of electrodes is adjustable with respect to the container position so as to define a plurality of liquid filling levels within said container.

13. A liquid dispenser according to claim 9, wherein said at least one conduit is made of non-electrically conductive material.

14. A liquid dispenser comprising:
   a receptacle adapted to receive a container,
   a couple of conduits for pouring liquid into said container, each of said couple of conduits being hydraulically connected to liquid supply means and provided with an outlet for dispensing said liquid and a valve means,
   a couple of electrodes arranged on an outer surface of each of the couple of conduits in a position facing the liquid flowing in each of the couple of conduits while being electrically insulated from said liquid,
   a controller electrically connected to said couple of electrodes, the controller being provided for measuring an impedance Z between said couple of electrodes.

15. A liquid dispenser according to claim 14, wherein said valve means is provided in said at least one conduit, said valve means being activated by said controller in response to placement of a container within said receptacle and/or in response to measurement of impedance Z between said couple of electrodes.

* * * * *